United States Patent
Masuo et al.

(10) Patent No.: US 8,215,198 B2
(45) Date of Patent: Jul. 10, 2012

(54) BACKLASH ELIMINATOR

(75) Inventors: Koichi Masuo, Ritto (JP); Kazuyuki Ishizu, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 468 days.

(21) Appl. No.: 12/444,707

(22) PCT Filed: Oct. 17, 2007

(86) PCT No.: PCT/JP2007/070294
§ 371 (c)(1),
(2), (4) Date: May 12, 2009

(87) PCT Pub. No.: WO2008/050658
PCT Pub. Date: May 2, 2008

(65) Prior Publication Data
US 2010/0064833 A1    Mar. 18, 2010

(30) Foreign Application Priority Data
Oct. 27, 2006   (JP) ................................ 2006-292195

(51) Int. Cl.
*F16H 55/18* (2006.01)
(52) U.S. Cl. .......................................... 74/409; 74/406
(58) Field of Classification Search .................... 74/406, 74/409, 411, 412 R, 421 A, 421 R
See application file for complete search history.

(56) References Cited

U.S. PATENT DOCUMENTS

| 3,398,595 A | 8/1968 | Clutter et al. |
| 4,435,110 A * | 3/1984 | Hunkeler ........................ 409/11 |
| 2004/0200302 A1* | 10/2004 | Kampichler et al. ........... 74/409 |

FOREIGN PATENT DOCUMENTS

| EP | 0 267 572 A2 | 5/1988 |
| JP | 54-85267 U | 6/1979 |
| JP | 59-39625 B2 | 9/1984 |
| JP | 62-56649 A | 3/1987 |
| JP | 62-62038 A | 3/1987 |
| JP | 1-158265 A | 6/1989 |
| JP | 7-180749 A | 7/1995 |
| JP | 8-226533 A | 9/1996 |
| JP | 2004-316791 A | 11/2004 |

* cited by examiner

*Primary Examiner* — Justin Krause
*Assistant Examiner* — Gregory Prather
(74) *Attorney, Agent, or Firm* — Birch, Stewart, Kolasch & Birch, LLP (57) ABSTRACT

A backlash eliminator includes an input shaft (15) coupled to a driving motor (20) and having a drive gear (52); an output shaft (14) fixing a gear (W), as an object to be cut, thereon, and having a driven gear (42); and a stationary intermediate shaft (16) and a moving intermediate shaft (17) disposed parallel to the input shaft and the output shaft, and having large intermediate gears (62, 72) meshing with the drive gear, and small intermediate gears (63, 73) meshing with the driven gear, and a switching regulating valve (31) for pressing the moving intermediate shaft in its axial direction so that an output-side backlash elimination torque (Ts) between the driven gear and the small intermediate gear (73) acts in the same direction as the direction of generation of a cutting load torque (Tw) generated in the circumferential direction of the gear during machining of the gear.

1 Claim, 7 Drawing Sheets

BACKLASH ELIMINATOR

BACKGROUND OF THE INVENTION

1. Field of the Invention

This invention relates to a backlash eliminator which eliminates backlash in a gear train while reducing a loss.

2. Description of the Related Art

When a pair of gears are brought into mesh, they should theoretically make a correct intermeshing motion. Since there is a slight pitch error, thermal expansion, warpage of the tooth, warpage of the shaft, thickness of an oil film, or the like, however, the teeth grate against each other, making the motion impossible, causing vibrations or producing a noise. To make a smooth intermeshing motion, therefore, a predetermined amount of clearance (backlash) is provided between the tooth flanks of the pair of gears.

When a load is intermittently imposed on a gear train having such gears sequentially intermeshing, elastic energy accumulated in the gear train is released whenever the load is reduced to zero. When this elastic energy is great, however, tooth flank separation occurs between the tooth flanks because of the provision of backlash, resulting in incorrect transmission of rotation. In particular, in a machine tool, such as a hobbing machine or a grinding machine, which indexes the position of relative rotation between a workpiece and a cutter with high accuracy, the tooth flank separation in the gear train, if any, leads to a corresponding deviation in the indexed position. This makes it impossible to determine (index) the exact rotational position of a rotating table, and is likely to exert direct influence on the machining accuracy of the workpiece.

Various backlash eliminators, which prevent tooth flank separation even under load imposed on the gear train, have been provided under these situations. Such conventional backlash eliminators are disclosed, for example, in Patent Document 1.

Patent Document 1: JP-A-7-180749

SUMMARY OF THE INVENTION

Problems to be solved by the invention

The above-described conventional backlash eliminator is equipped with an input shaft to be coupled to an output shaft of a prime motor, an output shaft for fixing an index object whose rotational position is to be indexed, and a reduction mechanism to be interposed between the input shaft and the output shaft, and has such a gear train as to interpose intermediate gears of the reduction mechanism between a drive gear of the input shaft and a driven gear of the output shaft. By pushing the intermediate gears in their axial direction to allow the tooth flanks of the intermediate gears to intermesh in the opposite direction, a backlash eliminating force is generated to eliminate backlash in the gear train.

The aforementioned conventional backlash eliminator adopts a correction moment introduction system or the like, thereby enabling a low loss to be achieved. However, this backlash eliminator gives no consideration to the pushing force on the intermediate gear, leaving a further reduced loss unachievable.

The present invention has been accomplished in an attempt to solve the above-mentioned problem. It is an object of the invention to provide a backlash eliminator which can eliminate backlash with a low loss while decreasing a backlash eliminating force to curtail friction and heat generation.

Means for Solving the Problems

A backlash eliminator according to a first aspect of the invention, intended for solving the above problems, is a backlash eliminator which is a gear train using helical gears, the backlash eliminator comprising:

an input shaft coupled to a prime motor and having a drive gear;

an output shaft disposed parallel to the input shaft, fixing a workpiece on the output shaft, and having a driven gear; and intermediate shafts disposed parallel to the input shaft and the output shaft, and each having a first intermediate gear meshing with the drive gear, and a second intermediate gear meshing with the driven gear, one of the intermediate shafts being supported to be stationary in an axial direction for positioning the output shaft in a rotating direction, and other of the intermediate shafts being supported to be movable in an axial direction for eliminating backlash between the other intermediate shaft and the output shaft, the backlash eliminator further comprising pressing means which presses the other intermediate shaft in the axial direction thereof so that a backlash eliminating force between the driven gear and the second intermediate gear is exerted in a direction identical with a direction of generation of a cutting load generated in a circumferential direction of the workpiece during machining of the workpiece.

A backlash eliminator according to a second aspect of the invention, intended for solving the above problems, is the backlash eliminator according to the first aspect of the invention, further comprising pressing force varying means which renders a pressing force of the pressing means variable in accordance with a magnitude of the cutting load.

Effects of the Invention

According to the backlash eliminator concerned with the present invention, a backlash eliminating force between the driven gear and the second intermediate gear is exerted in the same direction as the direction of generation of a cutting load generated in the circumferential direction of the workpiece during machining of the workpiece, whereby the backlash eliminating force can be decreased. Thus, friction and heat generation can be suppressed, and backlash elimination can be achieved with a low loss.

BRIEF DESCRIPTION OF THE DRAWINGS

FIG. 4(*a*) is a plan view of the gear train when a cutting load torque acts in a leftward rotating direction with respect to the rotating direction of a gear to be cut, FIG. 4(*b*) is a sectional view taken on line B-B in FIG. 4(*a*), and FIG. 4(*c*) is a sectional view taken on line C-C in FIG. 4(*a*).

DESCRIPTION OF THE REFERENCE NUMERALS AND SYMBOLS 2 rotating table, 4 hob cutter, 14 output shaft, 15 input shaft, 16 stationary intermediate shaft, 17 moving intermediate shaft, 18 casing, 20 driving motor, 24 upper piston member, 25 lower piston member, 26, 27 air chamber, 29, 30 air passage, 31 switching regulating valve, 42 driven gear, 51, 61, 71 shaft portion, 52 drive gear, 62, 72 large intermediate gear, 63, 73 small intermediate gear, W gear to be cut, R rotating direction of gear to be cut, Tw cutting load torque, Tb input shaft-side backlash elimination torque, Ts output shaft-side backlash elimination torque, F shaft pressing force

DETAILED DESCRIPTION OF THE INVENTION

The backlash eliminator according to the present invention will now be described in detail with reference to the accompanying drawings. The present embodiment has the backlash eliminator according to the present invention applied to a rotating table of a hobbing machine.

Figure 1:
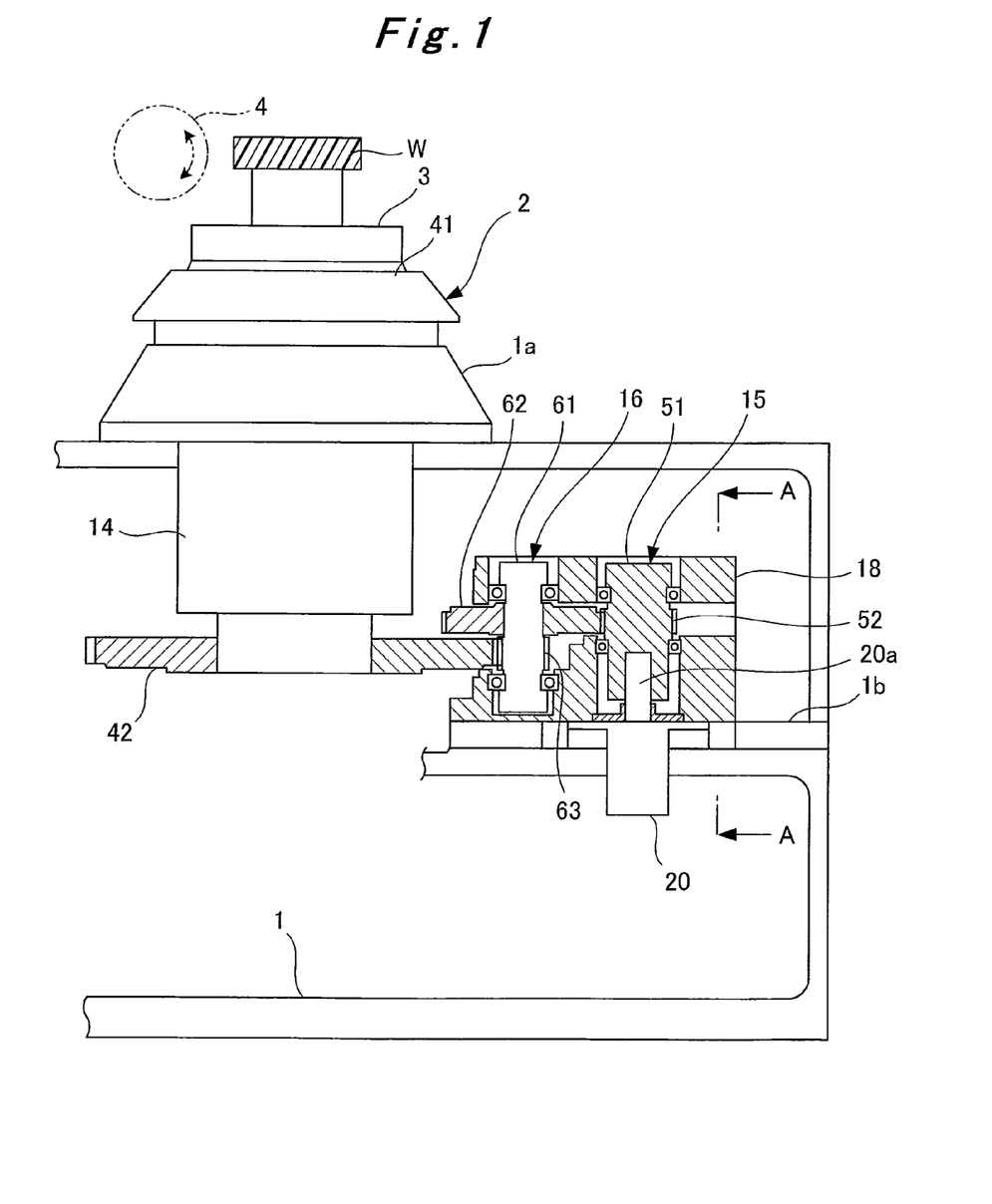
FIG. 1 is a side sectional view of a rotating table of a hobbing machine equipped with a backlash eliminator according to an embodiment of the present invention.
Figure 2:
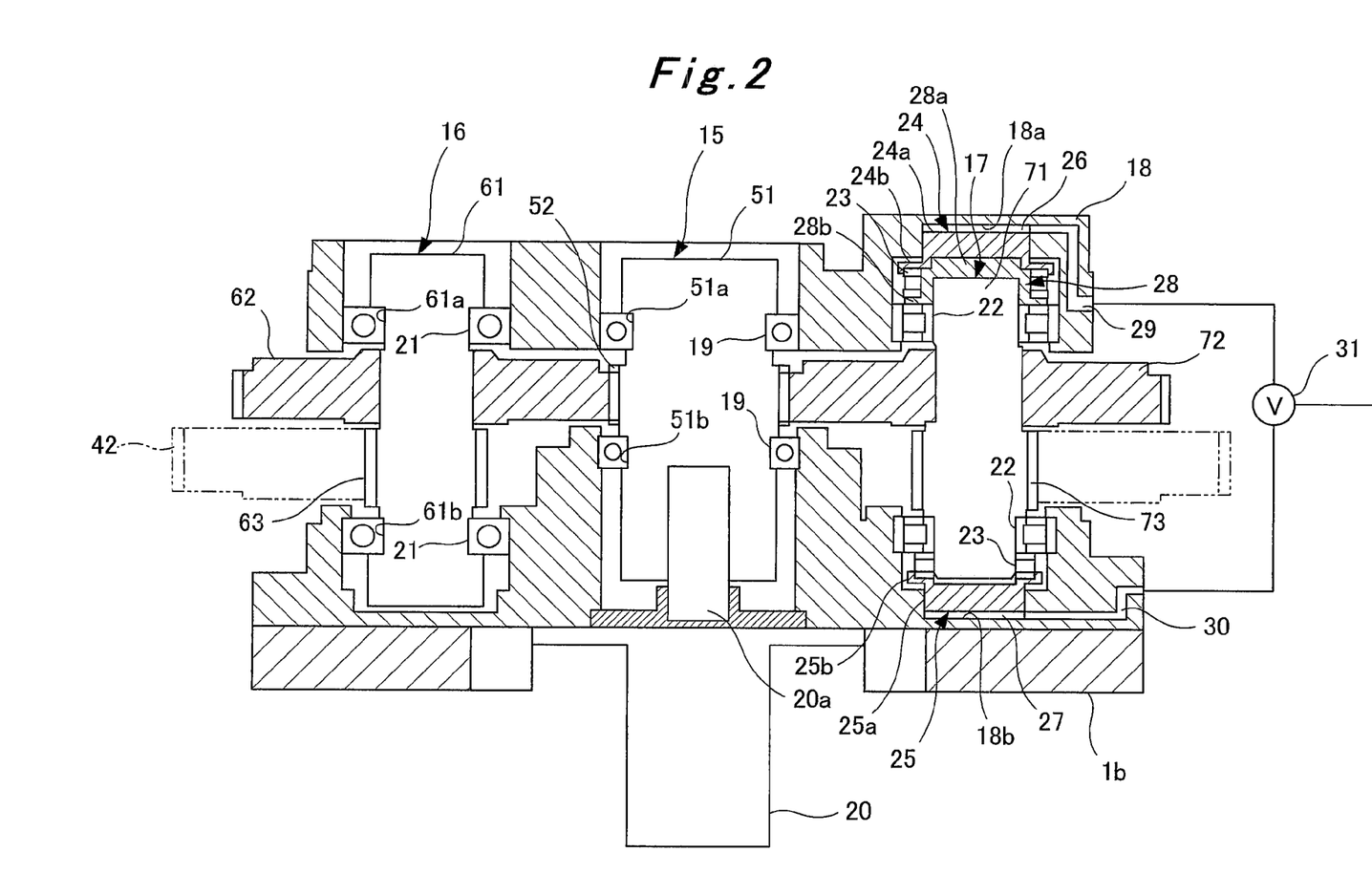
FIG. 2 is a sectional view taken on line A-A in FIG. 1.
Figure 3:
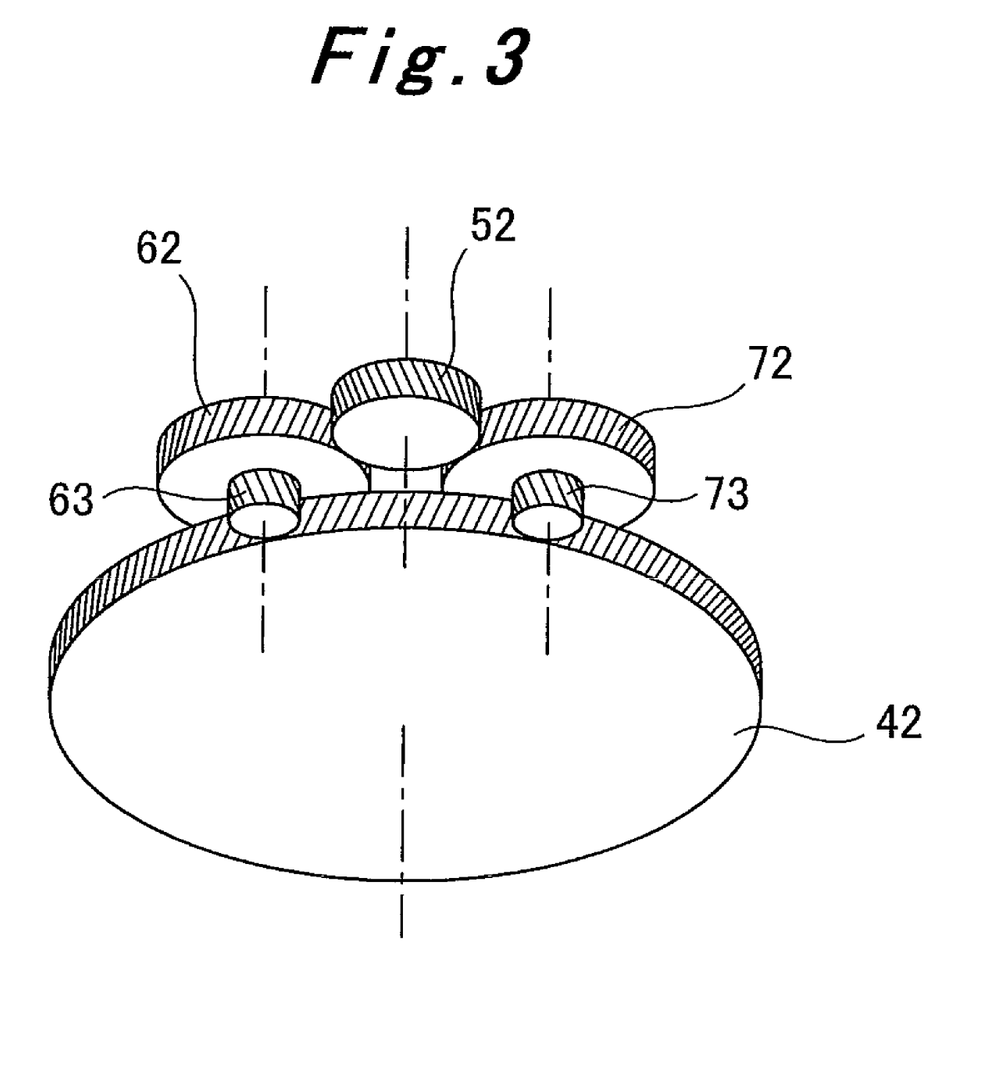
FIG. 3 is a schematic view of a gear train of the backlash eliminator according to the embodiment of the present invention.
Figure 4A:
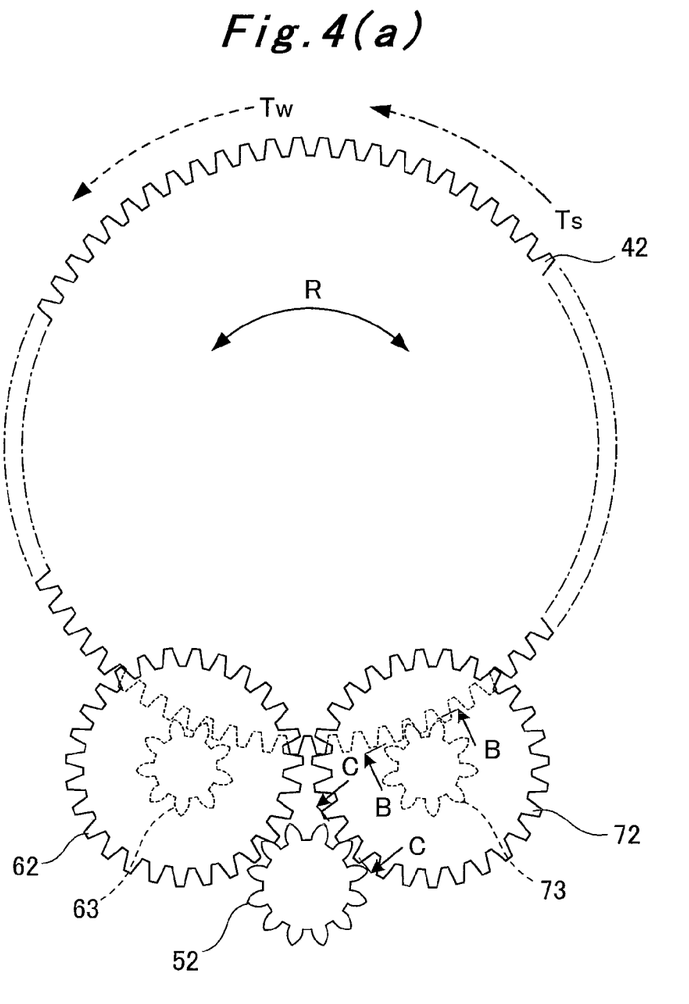
Figure 4B:
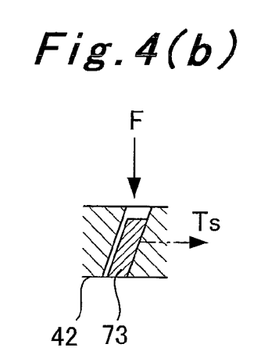
Figure 4C:
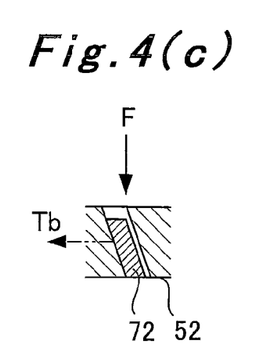
Figure 5A:
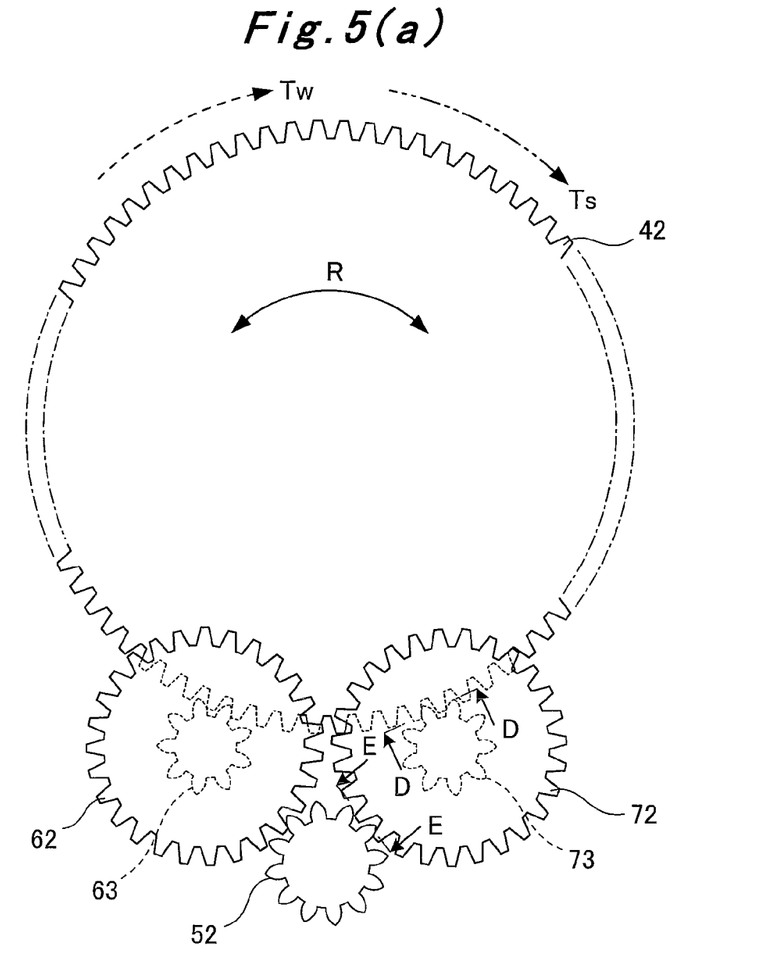
FIG. 5(a) is a plan view of the gear train when a cutting load torque acts in a rightward rotating direction with respect to the rotating direction of the gear to be cut.
Figure 5B:
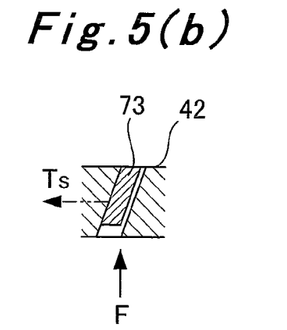
FIG. 5(b) is a sectional view taken on line D-D in FIG. 5(a)
Figure 5C:
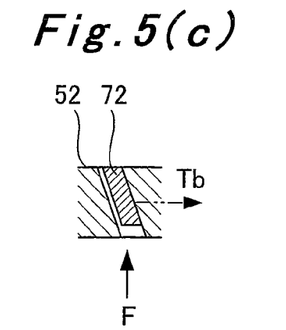
FIG. 5(c) is a sectional view taken on line E-E in FIG. 5(a).
Figure 6:
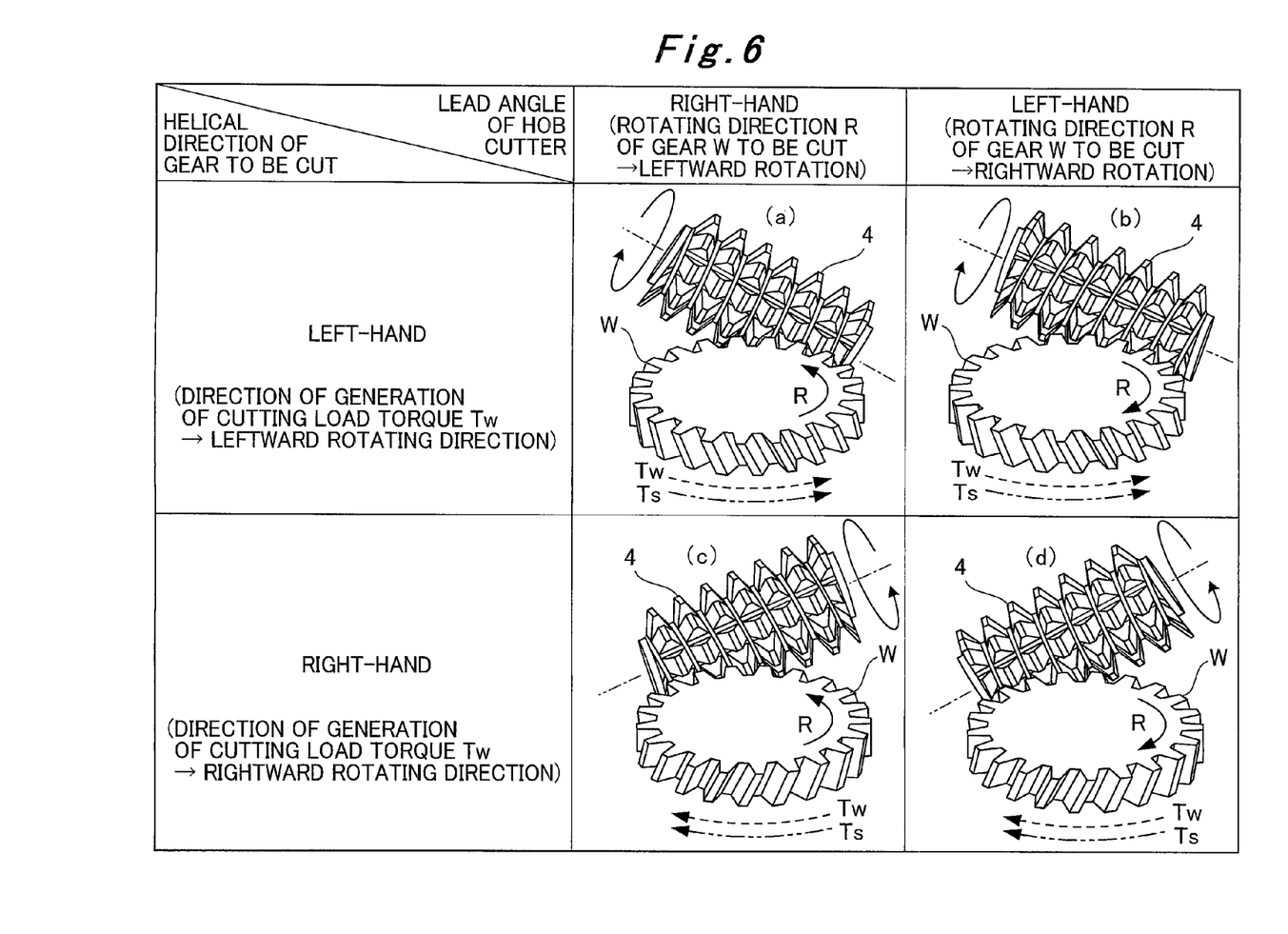
FIG. 6 is a view showing the rotating direction of the gear to be cut, and the direction of generation of the cutting load torque in combinations of the lead angle of the hob cutter and the helical direction of the tooth profile of the gear to be cut.
Figure 7A:
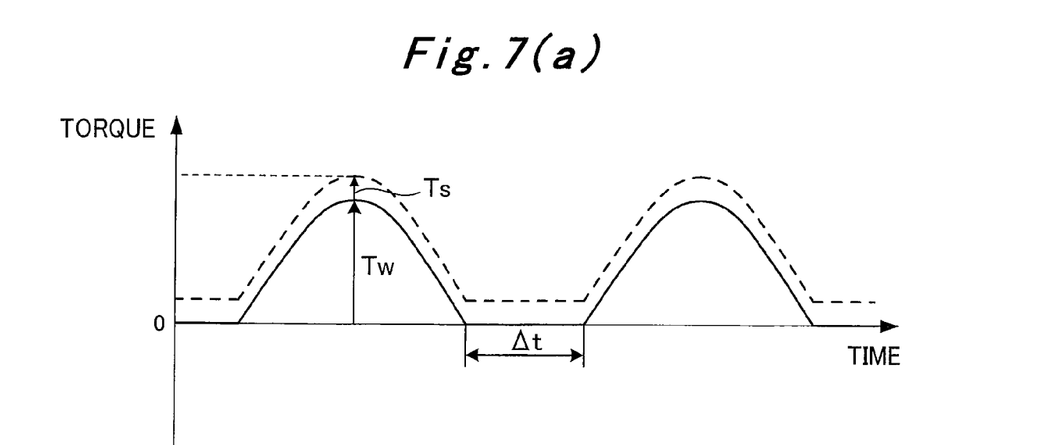
FIG. 7(a) is a view showing the magnitude of an output shaft-side backlash elimination torque when applied in the same direction as the direction of generation of the cutting load torque.
Figure 7B:
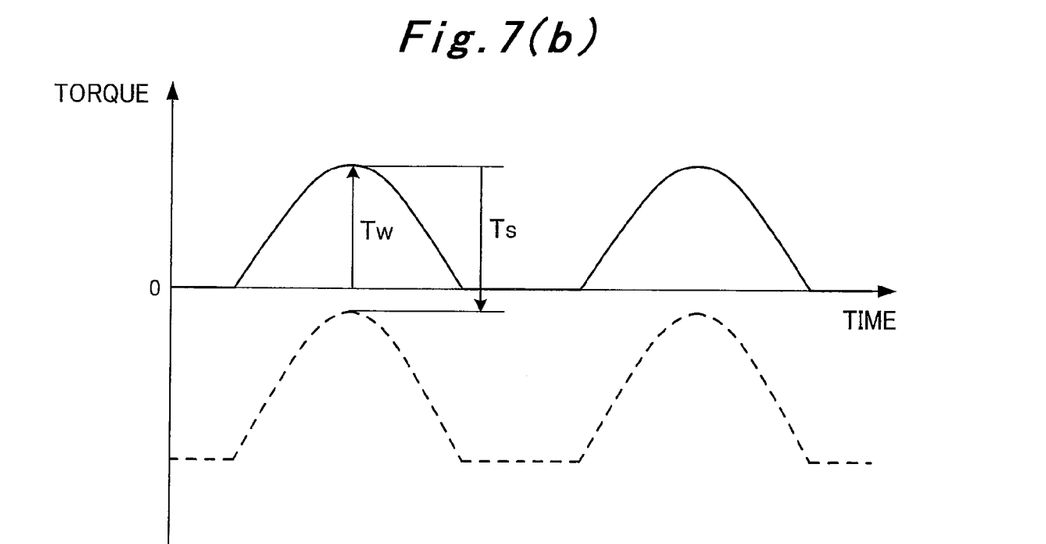
FIG. 7(b) is a view showing the magnitude of an output shaft-side backlash elimination torque when applied in a direction opposite to the direction of generation of the cutting load torque.

FIG. 1 is a side sectional view of a rotating table of a hobbing machine equipped with a backlash eliminator according to an embodiment of the present invention. FIG. 2 is a sectional view taken on line A-A in FIG. 1. FIG. 3 is a schematic view of a gear train of the backlash eliminator according to the embodiment of the present invention. FIG. 4(a) is a plan view of the gear train when a cutting load torque acts in a leftward rotating direction with respect to the rotating direction of a gear to be cut. FIG. 4(b) is a sectional view taken on line B-B in FIG. 4(a). FIG. 4(c) is a sectional view taken on line C-C in FIG. 4(a). FIG. 5(a) is a plan view of the gear train when a cutting load torque acts in a rightward rotating direction with respect to the rotating direction of the gear to be cut. FIG. 5(b) is a sectional view taken on line D-D in FIG. 5(a). FIG. 5(c) is a sectional view taken on line E-E in FIG. 5(a). FIG. 6 is a view showing the rotating direction of the gear to be cut, and the direction of generation of the cutting load torque in combinations of the lead angle of the hob cutter and the helical direction of the tooth profile of the gear to be cut. FIG. 7(a) is a view showing the magnitude of an output shaft-side backlash elimination torque when applied in the same direction as the direction of generation of the cutting load torque. FIG. 7(b) is a view showing the magnitude of an output shaft-side backlash elimination torque when applied in a direction opposite to the direction of generation of the cutting load torque.

The configuration of the backlash eliminator will be described with the use of FIGS. 1 to 3.

As shown in FIG. 1, a rotating table 2 is provided on a bed 1 of a hobbing machine (not shown), and a gear W to be cut is mounted on an upper surface of the rotating table 2 via a fitting 3. A hob cutter 4 is supported on a hob head (not shown), which is provided on the bed 1, so as to be rotatable nearly about a horizontal axis. A tooth profile is generated by the hob cutter 4 in the gear W to be cut.

A tubular base 1a is provided on an upper surface of the bed 1, and an output shaft 14 of the rotating table 2 is rotatably supported within the base 1a. A mounting portion 41 is provided at the upper end of the output shaft 14, while a driven gear 42 is fitted in the lower end of the output shaft 14. The gear W to be cut is mounted on an upper surface of the mounting portion 41 via the fitting 3.

A mounting stand 1b is formed in a side part of the bed 1. A casing 18 accommodating an input shaft 15, a stationary intermediate shaft 16, and a moving intermediate shaft 17 (these shafts will be described later) to be rotatable is provided on the mounting stand 1b. The input shaft 15, the stationary intermediate shaft 16, and the moving intermediate shaft 17 are arranged to be parallel to the output shaft 14.

As shown in FIGS. 1 to 3, the input shaft 15 has a shaft portion 51 disposed parallel to the output shaft 14, and a drive gear 52 formed on the outer peripheral surface, in a nearly intermediate part in the axial direction, of the shaft portion 51. Concave portions 51a, 51b are formed in the outer peripheral surface, above and below the drive gear 52, of the shaft portion 51. Radial bearings 19 supported by the casing 18 are fitted to the concave portions 51a, 51b. That is, the input shaft 15 is supported to be rotatable with respect to the casing 18, and to be restrained from moving in its axial direction. A driving motor 20 is supported to penetrate a bottom part of the casing 18 upwardly, and an output shaft 20a of the driving motor 20 is fitted into the lower end of the input shaft 15.

The stationary intermediate shaft 16 has a shaft portion 61 disposed parallel to the output shaft 14, a large intermediate gear 62 fitted on the shaft portion 61, and a small intermediate gear 63 which is formed in the outer peripheral surface, below the large intermediate gear 62, of the shaft portion 61 and which has a smaller diameter than the large intermediate gear 62. The large intermediate gear 62 of the stationary intermediate shaft 16 meshes with the drive gear 52 of the input shaft 15, while the small intermediate gear 63 meshes with the driven gear 42 of the output shaft 14.

Concave portions 61a, 61b are formed in the outer peripheral surface, above the large intermediate gear 62 and below the small intermediate gear 62, of the shaft portion 61. Radial bearings 21 supported by the casing 18 are fitted to the concave portions 61a, 61b. That is, the stationary intermediate shaft 16 is supported to be rotatable with respect to the casing 18, and to be restrained from moving in its axial direction.

The moving intermediate shaft 17 has a shaft portion 71 disposed parallel to the output shaft 14, a large intermediate gear 72 fitted on the shaft portion 71, and a small intermediate gear 73 which is formed in the outer peripheral surface, below the large intermediate gear 72, of the shaft portion 71 and which has a smaller diameter than the large intermediate gear 72. The large intermediate gear 72 of the moving intermediate shaft 17 meshes with the drive gear 52 of the input shaft 15, while the small intermediate gear 73 meshes with the driven gear 42 of the output shaft 14.

An upper piston member 24 and a lower piston 25 are provided above and below the shaft portion 71. The upper piston member 24 and the lower piston member 25 have columnar portions 24a, 25a moving to be slidable into an upper hole 18a and a lower hole 18b formed in the casing 18, and flange portions 24b, 25b formed at the proximal ends of the columnar portions 24a, 25b. Air chambers 26, 27 are formed, with a predetermined amount of clearance, between the upper hole 18a of the casing 18 and the columnar portion 24a of the upper piston member 24 and between the lower hole 18b of the casing 18 and the columnar portion 25a of the lower piston member 25.

A press member 28 is provided between the upper piston member 24 and the upper end of the shaft portion 71. The press member 28 has a cylindrical portion 28a covering the upper end of the shaft portion 71, and a flange portion 28b formed at the proximal end of the cylindrical portion 28a.

A radial bearing 22 is provided above the large intermediate gear 72 to be disposed along the flange portion 28b of the press member 28. A thrust bearing 23 is provided between the flange portion 24b of the upper piston member 24 and the flange portion 28b of the press member 28. On the other hand, a radial bearing 22 is provided below the small intermediate gear 73, and a thrust bearing 23 is provided between the inner race of the radial bearing 22 and the flange portion 25b of the lower piston member 25. That is, the moving intermediate shaft 17 is supported to be rotatable with respect to the casing 18, and to be movable in its axial direction.

Air passages 29, 30 are brought into communication with the air chambers 26, 27, and a switching regulating valve (pressing means, pressing force varying means) 31 is provided on the air passages 29, 30. The switching regulating valve 31 supplies air to the air chambers 26, 27 via the air passages 29, 30, and has a switching function of supplying air to either of the air chambers 26 and 27, and an air pressure adjusting function of rendering variable the air pressure of the air supplied.

The driven gear 42 of the output shaft 14, the drive gear 52 of the input shaft 15, the intermediate gears 62, 63 of the stationary intermediate shaft 16, and the intermediate gears 72, 73 of the moving intermediate shaft 17 constituting the gear train are formed to have the tooth profiles of helical gears. A predetermined amount of backlash is provided between the tooth flanks on which the respective gears mesh.

When a tooth profile is to be generated in the gear W to be cut with the use of the hobbing machine, therefore, the driving motor 20 is driven to be rotated in a normal or reverse direction, thereby rotating the input shaft 15. Its driving force is transmitted from the drive gear 52 to the large intermediate gear 62 of the stationary intermediate shaft 16 and the large intermediate gear 72 of the moving intermediate shaft 17, and is then reduced by the small intermediate gear 63 and the small intermediate gear 73. Then, the reduced driving force is transmitted to the driven gear 42, whereby the output shaft 14 is rotated, and the gear W to be cut is rotated nearly about a vertical axis. In conformity with the rotation of the gear W to be cut nearly about the vertical axis, the hob cutter 4 is rotationally driven by a drive device (not shown). During the synchronous rotation of the hob cutter 4 and the gear W to be cut, the hob cutter 4 is cut into the gear W to be cut, whereby the outer peripheral surface of the gear W to be cut is cut off by the cutting part of the hob cutter 4 to form a tooth profile.

When the gear W to be cut is to be machined by the hob cutter 4, moreover, the moving intermediate shaft 17 is moved either upward or downward to eliminate backlash within the gear train.

When the switching regulating valve 31 is actuated for switching to supply air to the air chamber 26 via the air passage 29, a shaft pressing force F, which moves the moving intermediate shaft 17 downwardly, acts downward, as shown in FIGS. 4(b) and 4(c), whereupon the large intermediate gear 72 and the small intermediate gear 73 of the moving intermediate shaft 17 move downward. As a result, the tooth flank of the large intermediate gear 72 contacts the tooth flank of the drive gear 52 of the input shaft 15 with input shaft-side backlash elimination torque Tb. Simultaneously, the tooth flank of the small intermediate gear 73 contacts the tooth flank of the driven gear 42 of the output shaft 14 with output shaft-side backlash elimination torque Ts.

Thus, the drive gear 52 of the input shaft 15 and the driven gear 42 of the output shaft 14 are brought into simultaneous contact with the large intermediate gear 72 and the small intermediate gear 73 of the moving intermediate shaft 17 at the opposing tooth flanks. Simultaneously, the drive gear 52 of the input shaft 15 and the driven gear 42 of the output shaft 14 are brought into simultaneous contact with the large intermediate gear 62 and the small intermediate gear 63 of the stationary intermediate shaft 16 on the side opposite to the tooth flanks contacted by the large intermediate gear 72 and the small intermediate gear 73 of the moving intermediate shaft 17, and at the opposing tooth flanks.

On the other hand, when the switching regulating valve 31 is actuated for switching to supply air to the air chamber 27 via the air passage 30, a shaft pressing force F, which moves the moving intermediate shaft 17 upwardly, acts upward, as shown in FIGS. 5(b) and 5(c), whereupon the large intermediate gear 72 and the small intermediate gear 73 of the moving intermediate shaft 17 move upward. As a result, the tooth flank of the large intermediate gear 72 contacts the tooth flank of the drive gear 52 of the input shaft 15 with input shaft-side backlash elimination torque Tb. Simultaneously, the tooth flank of the small intermediate gear 73 contacts the tooth flank of the driven gear 42 of the output shaft 14 with output shaft-side backlash elimination torque Ts.

Thus, the drive gear 52 of the input shaft 15 and the driven gear 42 of the output shaft 14 are brought into simultaneous contact with the large intermediate gear 72 and the small intermediate gear 73 of the moving intermediate shaft 17 at the opposing tooth flanks. Simultaneously therewith, the drive gear 52 of the input shaft 15 and the driven gear 42 of the output shaft 14 are brought into simultaneous contact with the large intermediate gear 62 and the small intermediate gear 63 of the stationary intermediate shaft 16 on the side opposite to the tooth flanks contacted by the large intermediate gear 72 and the small intermediate gear 73 of the moving intermediate shaft 17, and at the opposing tooth flanks.

Accordingly, backlash is eliminated between the drive gear 52 of the input shaft 15 and the large intermediate gear 62 of the stationary intermediate shaft 16, between the small intermediate gear 63 of the stationary intermediate shaft 16 and the driven gear 42 of the output shaft 14, between the drive gear 52 of the input shaft 15 and the large intermediate gear 72 of the moving intermediate shaft 17, and between the small intermediate gear 73 of the moving intermediate shaft 17 and the driven gear 42 of the output shaft 14.

The upward or downward shaft pressing force F on the moving intermediate shaft 17 is controlled by the supply air pressure adjustment of the switching regulating valve 31. By adjusting the shaft pressing force F, the magnitudes of the input shaft-side backlash elimination torque Tb and the output shaft-side backlash elimination torque Ts can be varied.

Next, methods for setting the direction of pressing and the force of pressing the moving intermediate shaft 17, namely, the direction of application of the output shaft-side backlash elimination torque Ts and the magnitude of this torque, will be described using FIGS. 4(a), 5(a), 6, and 7(a), 7(b).

Generally, in the hobbing machine, the rotating direction of the rotating table, namely, the rotating direction of the gear to be cut, is determined by the lead angle of the hob cutter. If, in this case, the lead angle of the hob cutter is formed to be right-hand helical, the rotating direction of the gear to be cut is set at a leftward rotation. If the lead angle of the hob cutter is formed to be left-hand helical, the rotating direction of the gear to be cut is set at a rightward rotation.

During machining, the gear to be cut is subjected to the intermittent cutting load of the hob cutter from the axial direction of the gear to be cut. Particularly when the gear to be cut is a helical gear, the cutting load imposed thereon is converted into a cutting load torque in the circumferential direction of the gear to be cut. The direction of generation of this cutting load torque is determined by the helical direction of the tooth profile machined in the gear to be cut. If, in this case, the tooth profile of a right-hand helix is machined in the gear to be cut, the cutting load torque in a rightward rotating direction is produced with respect to the rotating direction of the gear to be cut. If the tooth profile of a left-hand helix is machined in the gear to be cut, the cutting load torque in a leftward rotating direction is produced with respect to the rotating direction of the gear to be cut.

Thus, the lead angle of the hob cutter is right-hand helical or left-hand helical, and the tooth profile machined in the gear to be cut is in a right-hand helical configuration or in a left-hand helical configuration. Thus, combinations of the lead angle of the hob cutter and the helical direction of the gear to be cut can be divided into four combinations as shown in (a) to (d) of FIG. 6.

FIG. 6, (a) shows a case in which a tooth profile of a left-hand helix is to be machined in the gear W to be cut, with the use of the hob cutter 4 having a lead angle of a right-hand helix. In this case, the lead angle of the hob cutter 4 is formed to be right-hand helical, so that the rotating direction R of the gear W to be cut (the output shaft 14 of the rotating table 2) is set at a leftward rotation. Since the tooth profile in the left-hand helical configuration is to be machined in the gear W to be cut, moreover, a cutting load torque Tw is produced in a leftward rotating direction with respect to the rotating direction of the gear W to be cut.

FIG. 6, (b) shows a case in which a tooth profile of a left-hand helix is to be machined in the gear W to be cut, with the use of the hob cutter 4 having a lead angle of a left-hand helix. In this case, the lead angle of the hob cutter 4 is formed to be left-hand helical, so that the rotating direction R of the gear W to be cut is set at a rightward rotation. Since the tooth profile in the left-hand helical configuration is to be machined in the gear W to be cut, moreover, a cutting load torque Tw is produced in a leftward rotating direction with respect to the rotating direction of the gear W to be cut.

FIG. 6, (c) shows a case in which a tooth profile of a right-hand helix is to be machined in the gear W to be cut, with the use of the hob cutter 4 having a lead angle of a right-hand helix. In this case, the lead angle of the hob cutter 4 is formed to be right-hand helical, so that the rotating direction R of the gear W to be cut is set at a leftward rotation. Since the tooth profile in the right-hand helical configuration is to be machined in the gear W to be cut, moreover, a cutting load torque Tw is produced in a rightward rotating direction with respect to the rotating direction of the gear W to be cut.

FIG. 6, (d) shows a case in which a tooth profile of a right-hand helix is to be machined in the gear W to be cut, with the use of the hob cutter 4 having a lead angle of a left-hand helix. In this case, the lead angle of the hob cutter 4 is formed to be left-hand helical, so that the rotating direction R of the gear W to be cut is set at a rightward rotation. Since the tooth profile in the right-hand helical configuration is to be machined in the gear W to be cut, moreover, a cutting load torque Tw is produced in a rightward rotating direction with respect to the rotating direction of the gear W to be cut.

When the cutting load torque Tw is to be produced in the leftward rotating direction with respect to the rotating direction of the gear W to be cut, as shown in FIGS. 6, (a) and 6, (b), the shaft pressing force F is exerted downward, as shown in FIGS. 4(b), 4(c), to move the moving intermediate shaft 17 downward. By so doing, the output shaft-side backlash elimination torque Ts by the small intermediate gear 73 is generated in the leftward rotating direction, which is the direction of generation of the cutting load torque Tw, with respect to the rotating direction of the gear W to be cut.

On the other hand, when the cutting load torque Tw is generated in the rightward rotating direction with respect to the rotating direction of the gear W to be cut, as shown in FIGS. 6, (c) and (d), the shaft pressing force F is exerted upward, as shown in FIGS. 5(b), 5(c), to move the moving intermediate shaft 17 upward. By so doing, the output shaft-side backlash elimination torque Ts by the small intermediate gear 73 is generated in the rightward rotating direction, which is the direction of generation of the cutting load torque Tw, with respect to the rotating direction of the gear W to be cut.

As described above, during machining, the output shaft-side backlash elimination torque Ts is applied in the same direction as the direction of generation of the cutting load torque Tw. If the rotating direction in which the cutting load torque Tw is generated with respect to the rotating direction of the gear W to be cut is taken as positive, the output shaft-side backlash elimination torque Ts is also positive.

Thus, the output shaft-side backlash elimination torque Ts can be rendered small by allowing the output shaft-side backlash elimination torque Ts to act in the same direction as the direction of generation of the cutting load torque Tw, as shown in FIG. 7(a). Assume here, as shown in FIG. 7(b), that the output shaft-side backlash elimination torque Ts is to be applied in a rotating direction opposite to the rotating direction in which the cutting load torque Tw is generated. In this case, the output shaft-side backlash elimination torque Ts needs to be rendered greater than the cutting load torque Tw, resulting in an increased loss.

Furthermore, the output shaft-side backlash elimination torque Ts is always applied. Thus, even when the cutting load torque Tw does not occur (Δt in the drawing) because of intermittent cutting by the hob cutter 4, the tooth flank of the small intermediate gear 73 of the moving intermediate shaft 17 is in constant contact with the tooth flank of the driven gear 42 of the output shaft 14. Thus, there is no error in the transmission of rotation.

By adjusting the switching regulating valve 31, moreover, the magnitude of the output shaft-side backlash elimination torque Ts can be set at an appropriate value in accordance with the magnitude of the cutting load torque Tw. Thus, the output shaft-side backlash elimination torque Ts is efficiently applied without being too greater or too smaller than required.

According to the backlash eliminator concerned with the present invention, therefore, the output shaft-side backlash elimination torque Ts of the small intermediate gear 73 of the moving intermediate shaft 17, which is applied to the driven gear 42 of the output shaft 14 mounted with the gear W to be cut, is allowed to act in the same direction as the direction of generation of the cutting load torque Tw caused in the circumferential direction of the gear W to be cut during machining. By so doing, the output shaft-side backlash elimination torque Ts can be rendered small. As a result, the shaft pressing force F for moving the moving intermediate shaft 17 can be rendered low. Thus, friction or heat generation associated with the movement of the moving intermediate shaft 17 can be suppressed, and backlash elimination can be performed with a low loss.

Moreover, the air pressure to the air chambers 26, 27 by the switching regulating valve 31 can be varied to make the shaft pressing force F on the moving intermediate shaft 17 adjustable. Thus, the output shaft-side backlash elimination torque Ts can be controlled in accordance with the magnitude of the cutting load torque Tw. Consequently, the output shaft-side backlash elimination torque Ts of an appropriate magnitude can be applied, so that backlash elimination can be performed efficiently.

INDUSTRIAL APPLICABILITY

The backlash eliminator of the present invention can be applied to a variable speed gearing having a gear train whose rotating direction is switched to a normal direction or a reverse direction during operation, and whose load torque applied during operation does not change in direction.

The invention claimed is:

1. A backlash eliminator adapted to eliminate backlash in a gear train using helical gears when a workpiece whose tooth profile is to be machined by a cutting tool is rotated by the gear train, the backlash eliminator comprising:
   an input shaft coupled to a motor and having a drive gear;
   an output shaft disposed parallel to the input shaft, and to which the workpiece is fixed coaxially with the output shaft, and having a driven gear; and
   intermediate shafts disposed parallel to the input shaft and the output shaft, and each having a first intermediate gear meshing with the drive gear, and a second intermediate gear meshing with the driven gear, one of the intermediate shafts being supported to be stationary in an axial direction for positioning the output shaft in a rotating direction, and other of the intermediate shafts being supported to be movable in an axial direction for eliminating backlash between the other intermediate shaft and the output shaft; and
   pressing means which presses the other intermediate shaft in the axial direction thereof in a switchable manner to exert a backlash eliminating force between the driven gear and the second intermediate gear in a direction identical with a direction of generation of a cutting load generated in a circumferential direction of the workpiece during machining of the workpiece,
   wherein the other intermediate shaft is disposed such that a first clearance is formed between the casing and one end of the other intermediate shaft and a second clearance is formed between the casing and another end of the other intermediate shaft opposite to the first one end, and
   the pressing means selectively supplies air to the first clearance and the second clearance to press the other intermediate shaft in the axial direction thereof in a switchable manner.

* * * * *